(12) United States Patent
Rosenfeld et al.

(10) Patent No.: US 9,954,385 B2
(45) Date of Patent: Apr. 24, 2018

(54) EMI SUPPRESSION WITH WIRELESS CHARGING

(71) Applicant: Intel Corporation, Santa Clara, CA (US)

(72) Inventors: Jonathan Rosenfeld, Portland, OR (US); Geoffrey Jensen, Hillsboro, OR (US); Patrick W. Chewning, Beaverton, OR (US); Sean L. Molloy, Hillsboro, OR (US); Hao-Han Hsu, Portland, OR (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 137 days.

(21) Appl. No.: 14/757,912

(22) Filed: Dec. 24, 2015

(65) Prior Publication Data
US 2017/0187220 A1 Jun. 29, 2017

(51) Int. Cl.
  *H02J 7/00* (2006.01)
  *H02J 7/02* (2016.01)
  *H02J 50/12* (2016.01)

(52) U.S. Cl.
  CPC ............ *H02J 7/025* (2013.01); *H02J 7/0042* (2013.01); *H02J 50/12* (2016.02)

(58) Field of Classification Search
  USPC .......................................................... 320/108
  See application file for complete search history.

(56) References Cited

U.S. PATENT DOCUMENTS

| 2009/0096413 | A1* | 4/2009 | Partovi | H01F 5/003 320/108 |
| 2013/0181668 | A1* | 7/2013 | Tabata | H01F 38/14 320/108 |
| 2015/0256023 | A1* | 9/2015 | Yeom | H02J 5/005 320/108 |
| 2016/0134149 | A1* | 5/2016 | Yang | H02J 7/045 320/108 |

\* cited by examiner

*Primary Examiner* — Samuel Berhanu
(74) *Attorney, Agent, or Firm* — International IP Law Group, P.L.L.C.

(57) ABSTRACT

A computing device includes a charging coil for producing a charging current when placed in a magnetic field of a wireless power transmitter. A wireless charging operating frequency is associated with wireless charging of a battery of the computing device by the charging coil and the wireless power transmitter. An electrically conductive substrate has a plurality of gaps for reducing eddy currents when the electrically conductive substrate is disposed between the charging coil and the wireless power transmitter during charging of the battery. A plurality of filters each electrically bridge a respective one of the gaps. Each filter attenuates signals within a range of frequencies including the wireless charging operating frequency.

20 Claims, 9 Drawing Sheets

300

500

600

800

EMI SUPPRESSION WITH WIRELESS CHARGING

TECHNICAL FIELD

This disclosure relates generally to techniques for wireless charging. Specifically, this disclosure relates to suppressing electromagnetic interference (EMI) in a device configured for wireless charging.

BACKGROUND ART

To regulate electromagnetic (EM) radiation and conduction of electronic devices, regulatory limits have been mandated by governmental agencies all over the world, such as the FCC in the U.S. and the CISPR in the E.U. In order to comply with these regulations, different techniques to mitigate EM radiation are applied to a product, ranging from board layout to filtering to shielding. One of the most common techniques to reduce EM interference (EMI) is to create some sort of metallic enclosure around the product, e.g., a Faraday cage. Such EMI reduction techniques may be difficult to deploy in a system that uses wireless charging.

A basic wireless charging system may include a wireless power transmitter unit (PTU) and a wireless power receiving unit (PRU). For example, a PTU may include a transmit (Tx) coil, and a PRU may include a receive (Rx) coil. Magnetic resonance wireless charging may employ a magnetic coupling between the Tx coil and the Rx coil. When a wireless charging module is integrated in a product, the Faraday cage approach to EMI reduction may interfere with the wireless charging.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

The present disclosure relates generally to techniques for wirelessly charging an electronic device. Specifically, the techniques described herein include an apparatus in a wireless power transmitting unit (PTU) having a transmitter (Tx) coil configured to generate a magnetic field. The electronic device may have an electrically conductive enclosure for shielding and reducing the level of electromagnetic emissions that escape from the device and that could possibly interfere with other nearby electronics. However, this enclosure may also reduce the magnetic field within the electronic device as generated by the PTU due to eddy currents circulating through the body of the enclosure. In order to prevent such eddy currents, the conductive enclosure may have gaps in its electrically conductive material, or electrical discontinuities. However, these gaps may reduce the effectiveness of the electromagnetic shielding function of the enclosure. According to the present disclosure, a parallel LC resonant filter may be connected across each of the gaps to pass all frequencies except for the frequency at which the wireless charging occurs. Hence, the gaps may effectively prevent eddy currents at the wireless charging frequency while at the same time providing what electrically appears to be a continuous shield for suppression of electromagnetic interference.

The techniques discussed herein may be implemented using a wireless charging standard protocol, such as the specification provided by Alliance For Wireless Power (A4WP) version 1.3, Nov. 5, 2014. A wireless power receiving (Rx) coil may be a component in a power receiving unit (PRU), while a wireless power transmission (Tx) coil may be a component in a power transmitting unit (PTU), as discussed in more detail below. However, the techniques described herein may be implemented using any other wireless charging standard protocol where applicable.

Figure 1:
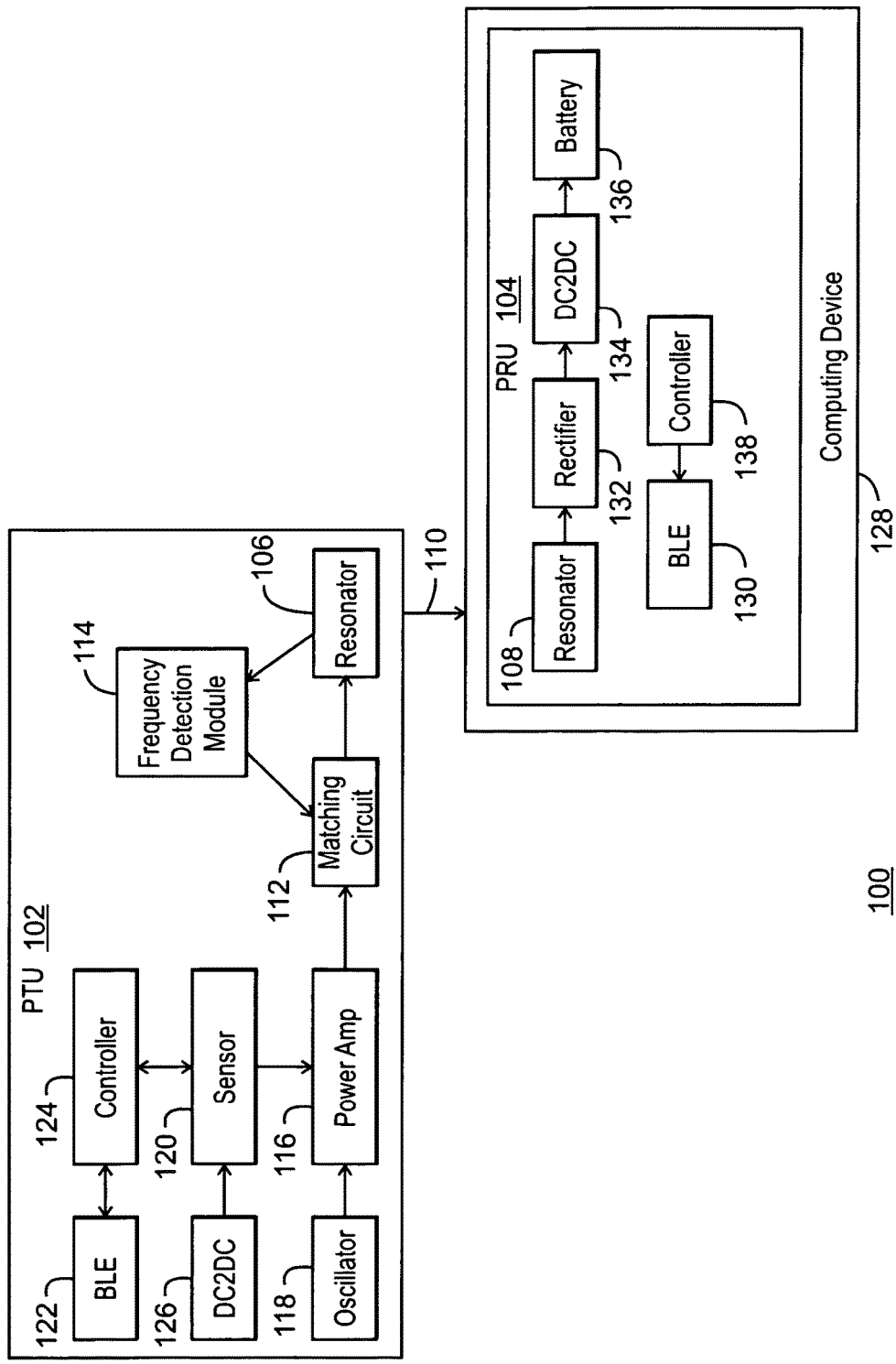
FIG. 1 is block diagram of a PTU to provide power to a PRU.

FIG. 1 is block diagram of a PTU to provide power to a PRU, wherein the PTU includes a resonant frequency detection circuit. A PTU 102 may be coupled to a PRU 104 via magnetic inductive coupling between resonators 106 and 108, as indicated by the arrow 110. The PRU 104 may be a component of a computing device 128 configured to receive charge by the inductive coupling 110. The resonator 106 may be referred to herein as a Tx coil 106 of the PTU 102. The resonator 108 may be referred to herein as an Rx coil 108 of the PRU 104.

The PRU 104 may include a matching circuit 112 configured to match the amplified oscillation provided to the resonator 106 of the PTU 102. The matching circuit 112 may include any suitable arrangement of electrical components such as capacitors, inductors, and other circuit elements that can be adjusted match the resonator 106 to the power amplifier 116. The operation of the matching circuit 112 can generate a reactance shift to compensate for detuning of the magnetic inductive coupling 110.

Other components of the PTU may include a power amplifier 116, and oscillator 118, a current sensor 120, a Bluetooth Low Energy (BLE) module 122, a controller 124, direct current to direct current (DC2DC) converter 126, and the like. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 140 of the PTU 102. The controller 140 may power on the power amplifier 116 configured to receive direct current (DC) from the DC2DC converter 126, and to amplify and oscillate the current. The oscillator 118 may be configured to oscillate the power provided at a given frequency.

As shown in FIG. 1, an inductive coupling 110 may occur between the Tx coil 106 and the Rx coil 108, and as a magnetic flux associated with the inductive coupling passes through the Rx coil 108 the computing device 111 may receive power. A rectifier 132 may receive voltage having an alternating current (AC) from the Rx coil 108 and may be configured to generate a rectified voltage (Vrect) having a direct current (DC). As illustrated in FIG. 1, a DC2DC converter 134 may provide a DC output to a battery 136.

The PRU 104 may also include a controller 138 configured to initiate a wireless broadcast having wireless handshake data. As discussed above, the wireless handshake broadcast may be carried out by a wireless data transmission component such as BLE module 130.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

The disclosure may include selectively breaking the conductive enclosure at the frequency of interest. By placing a parallel LC resonant filter across designated physical openings of the enclosure, frequency dependent operation may be achieved, enabling a closed enclosure at high frequencies while maintaining an open enclosure at the wireless charging operating frequency of 6.78 MHz. In this manner, EMI can be reduced while enabling wireless charging.

The LC parallel circuit may exhibit high impedance at the resonance frequency $1/(2\pi(LC)^{1/2})$, and much lower impedance at higher frequencies. The LC filter may be designed to resonate at the wireless charging frequency of 6.78 MHz, exhibiting high impedance and effectively preventing eddy currents from forming. At higher frequencies, the LC filter may short the openings in the structure and effectively form a continuous closed enclosure. The net result is a three-dimensional, electrically conductive enclosure that acts like a closed Faraday cage for all frequencies except the wireless charging frequency.

The present disclosure may enable a higher level of power transfer to the wireless charging circuit. The disclosure may also enable the wireless charging coil to be fully integrated inside of the product. The disclosure may further enable the product's conductive enclosure to aid in protecting the system from electrostatic discharge damage, and enables the product to not exceed regulatory limits on electromagnetic radiation.

Figure 2:
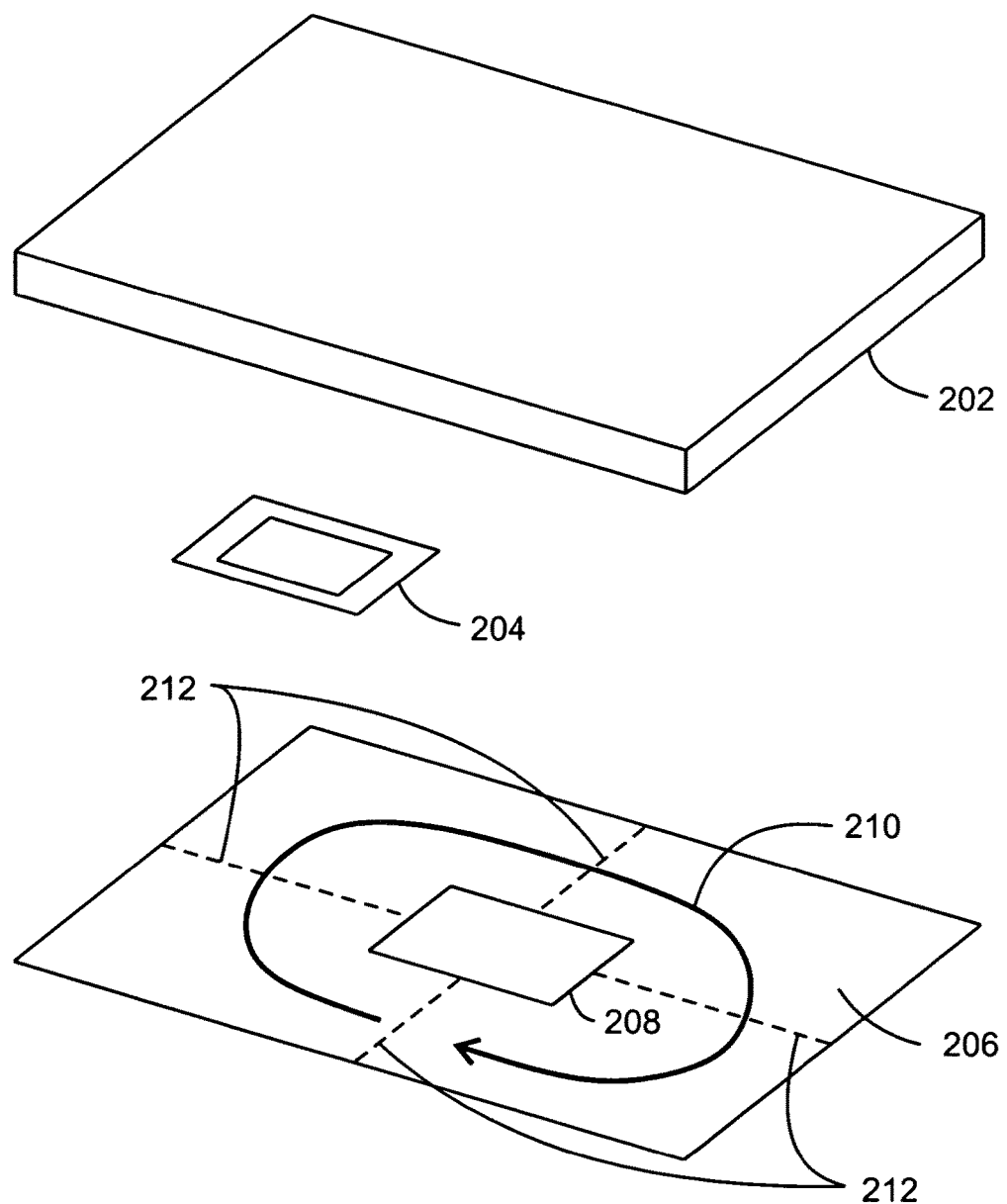
FIG. 2 is an exploded, perspective view of a generic tablet computer or laptop computer, including a top cover, charging coil, and bottom cover.

As stated above, formation of eddy currents is detrimental for wireless charging operation since the transmitted magnetic field is cancelled by the eddy currents' magnetic field such that less power can be transferred. To remedy this phenomenon, slits on the bottom cover of the device can be made to break the eddy current loop and therefore, reduce the cancelling magnetic field, as shown in FIG. 2. FIG. 2 illustrates a generic tablet computer or laptop computer 200 including a top cover 202, a charging coil 204, and a bottom cover 206. Bottom cover 206 may have an electrically non-conductive base covered by an electrically conductive coating. On bottom cover 206, a window 208 is cut out, perhaps only in the electrically conductive coating, to enable the magnetic field from the wireless transmitter to penetrate through the device and couple to the receiver coil. That is, window 208 may increase a magnitude of the magnetic field produced by the PTU at charging coil 204. In the case of a laptop computer, top cover 202 may be adjacent to, or may represent, the keyboard of the laptop computer; and bottom cover 206 may be adjacent to, or may represent, the bottom supporting wall or base of the laptop computer that typically is set upon, or is supported by, a user's lap or a table top. During charging, bottom cover 206 may rest upon the charging mat. Bottom cover 206 may be electrically conductive such that it forms one wall of a Faraday cage for suppressing EMI from the computing device.

Eddy currents 210 may be formed in bottom cover 206 during wireless charging. In order to prevent the formation of eddy currents, one or several gaps or slits 212 may be provided in the electrically conductive coating on bottom cover 206, but not necessarily in the electrically conductive base of bottom cover 206. Slits 212 may be in communication with window 208, and each slit 212 may extend in a radially outward direction from window 208. Each adjacent pair of slits 212 may electrically isolate a respective section of bottom cover 206.

Figure 3:
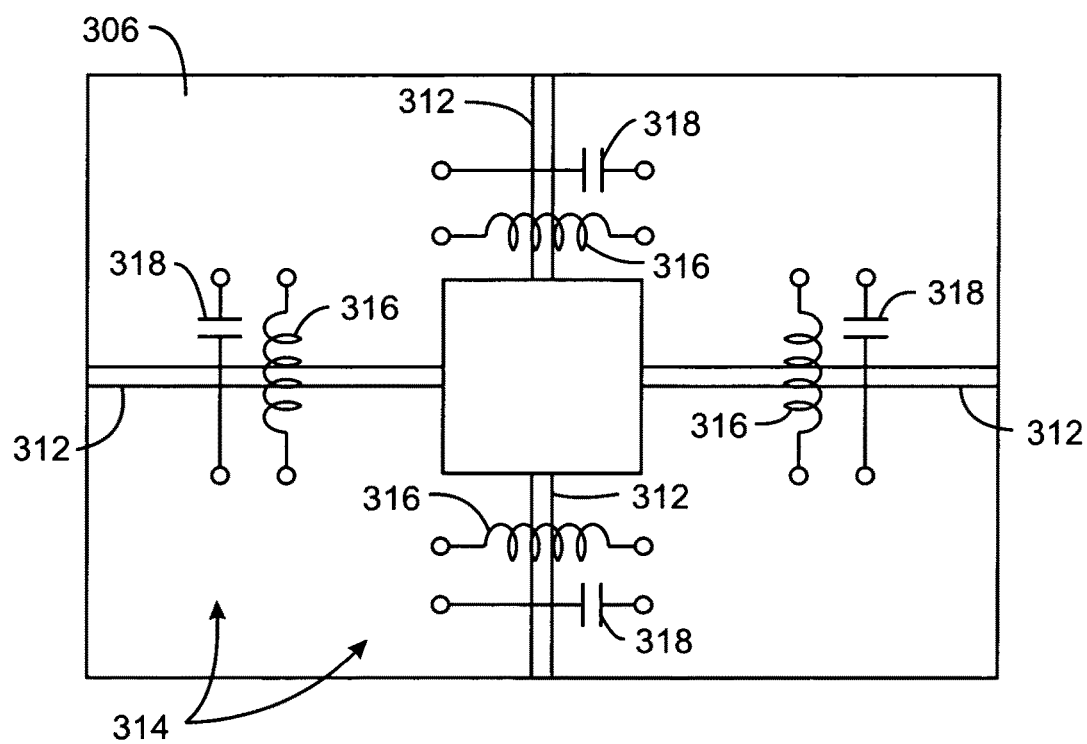
FIG. 3 is a plan view of another embodiment of a bottom cover of a generic tablet computer or laptop computer including slits and LC filters.

Once such an approach is implemented, however, EMI and electrostatic discharge may be increased because the ideal continuous Faraday cage is now broken by these slits 212. To achieve both objectives of wireless charging operation and immunity to EMI, a band stop filter in the form of a parallel resonant LC filter can be placed across each of these slits, according to the disclosure, as illustrated in FIG. 3. FIG. 3 illustrates another embodiment of a bottom cover 306 of a generic tablet computer or laptop computer, including LC filters 314 connected across slits 312. Each LC filter 314 includes an inductive element 316 and a capacitive element 318 connected in parallel across, or bridging, a respective slit 312. The LC circuits 314 act like a short-circuit for all frequencies except the resonant frequency. In this configuration, the enclosure's conductive surface acts like a solid plane for EMI/ESD frequencies, and acts like a segmented plane for wireless charging frequencies, blocking the formation of current loops. The number and position of slits and filters can be adjusted for various effects.

LC filters 314 may each be electrically connected to bottom cover 306 at two corresponding locations on opposite sides of a respective one of the slits. Each LC filter 314 has a high impedance at frequencies within a range of the wireless charging operating frequency of 6.78 MHz, and has a low impedance at frequencies outside of the range of frequencies including the wireless charging operating frequency. Each LC filter 314 may pass frequencies emitted by the computing device during operation, and may pass harmonics of the frequencies emitted by the computing device during operation.

Although inductive elements 316 and capacitive elements 318 may be discrete elements, it is to be understood that there are many different ways within the scope of the disclosure to apply capacitance and inductance across the slits, such as with tape having these electrical properties, for example. One possible way to implement such LC filters is to use flexible printed circuit boards (PCB) or flexible printed circuits (FPC). The flexibility of the LC filter PCB provides ease of integration in areas where flat surfaces are not available.

In one embodiment, the LC filter is provided on a small circuit board produced using flex-circuit techniques and soldering processes. Features on this circuit board enable easy attachment to the electrically conductive surfaces of bottom cover 306.

Figure 4:
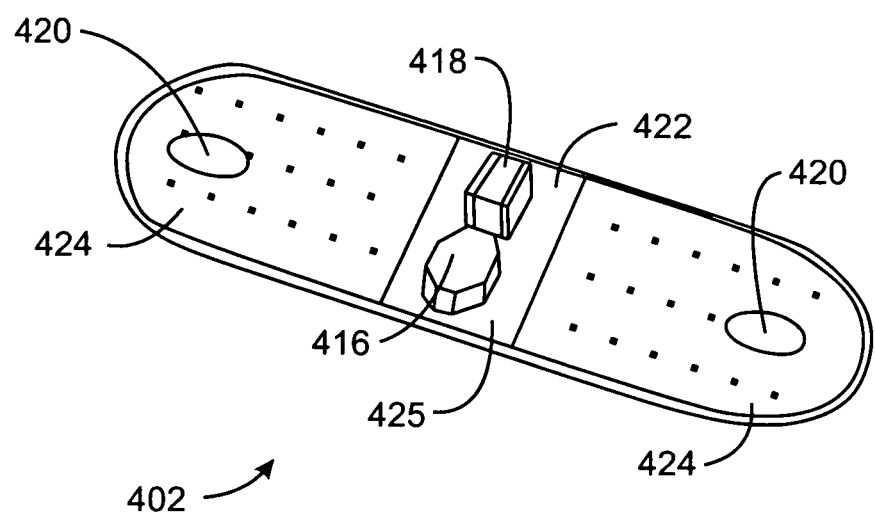
FIG. 4 is a perspective view of one embodiment of a flexible printed circuit board including an LC filter.

FIG. 4 illustrates one embodiment of a flexible printed circuit board 402 including an LC filter in the form of a capacitor 418 and an inductor 416. Board 402 includes holes 420 for easy assembly to the chassis in the form of bottom cover 306. Substrate 422 is flexible to enable transition to different elevations of the chassis. Large circuit attach areas 424 are provided for conduction to surfaces. Circuit attach areas 424 sandwich an electrically non-conductive area 425 therebetween, on which capacitor 418 and inductor 416 are mounted.

Figure 5:
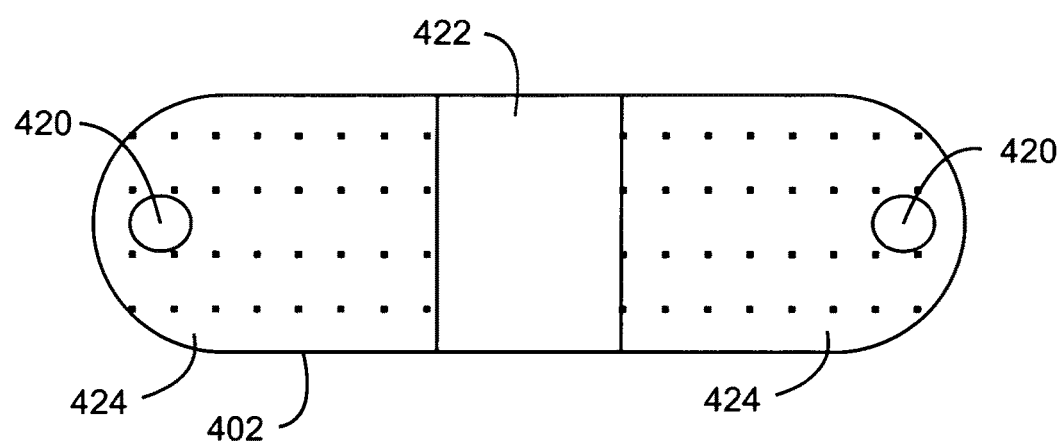
FIG. 5 is a plan view of the flexible printed circuit board of FIG. 4.

FIG. 5 illustrates the flexible printed circuit board 402 of FIG. 4, including four exposed electrically conductive areas 424. There are four such conductive areas 424 (two on each side) on board 402, with only two conductive areas 424 being visible in FIGS. 4 and 5. The four conductive areas 424 enable versatile uses and mounting methods. The four conductive areas 424 may include electroless nickel immersion gold (ENIG) plating.

Figure 6:
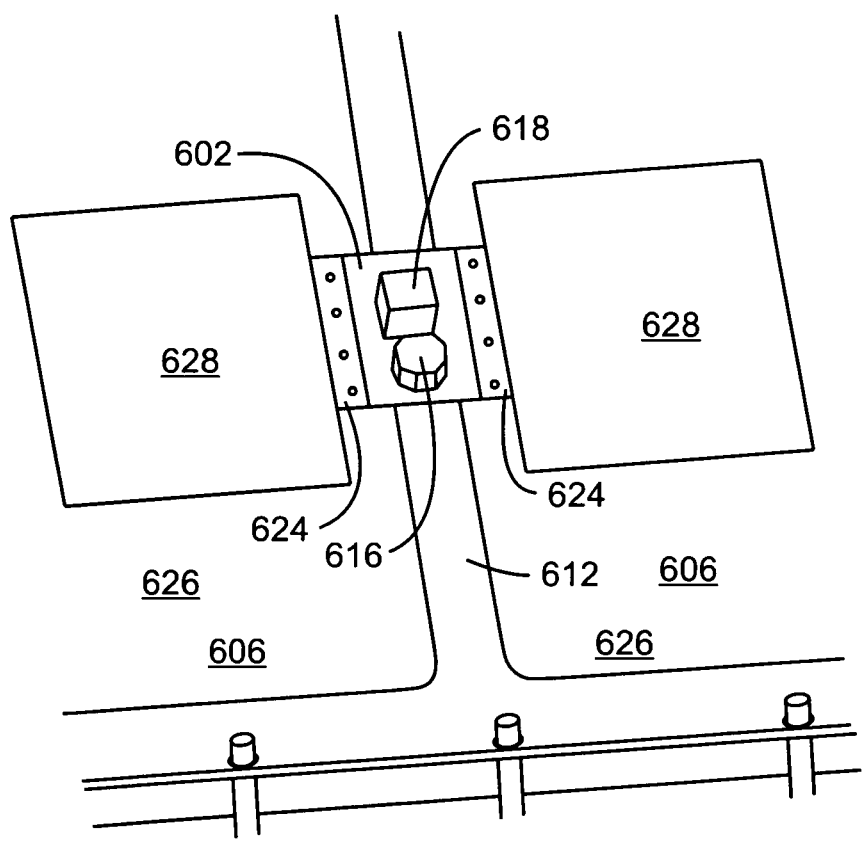
FIG. 6 is a fragmentary perspective view of a flexible printed circuit board and LC filter attached to a bottom cover of a generic tablet computer or laptop computer.

FIG. 6 is a fragmentary perspective view of a flexible printed circuit board 602 and LC filter including a capacitor 618 and an inductor 616 attached to a bottom cover 606 of a generic tablet computer or laptop computer. Flexible printed circuit board 602 bridges across a slit 616 in the electrically conductive surface of bottom cover 606, with two conductive areas 624 of board 602 engaging each of the two opposing sections 626 in the electrically conductive surface of bottom cover 606. The electrically conductive surface of bottom cover 606 may be in the form of copper foil. Flexible printed circuit board 602 may be attached to the copper foil of bottom cover 606 with copper tape 628. Conductive areas 624 of flexible printed circuit board 602 may enable good electrical contact to the electrically conductive surface of bottom cover 606 without the need for soldering.

Figure 7:
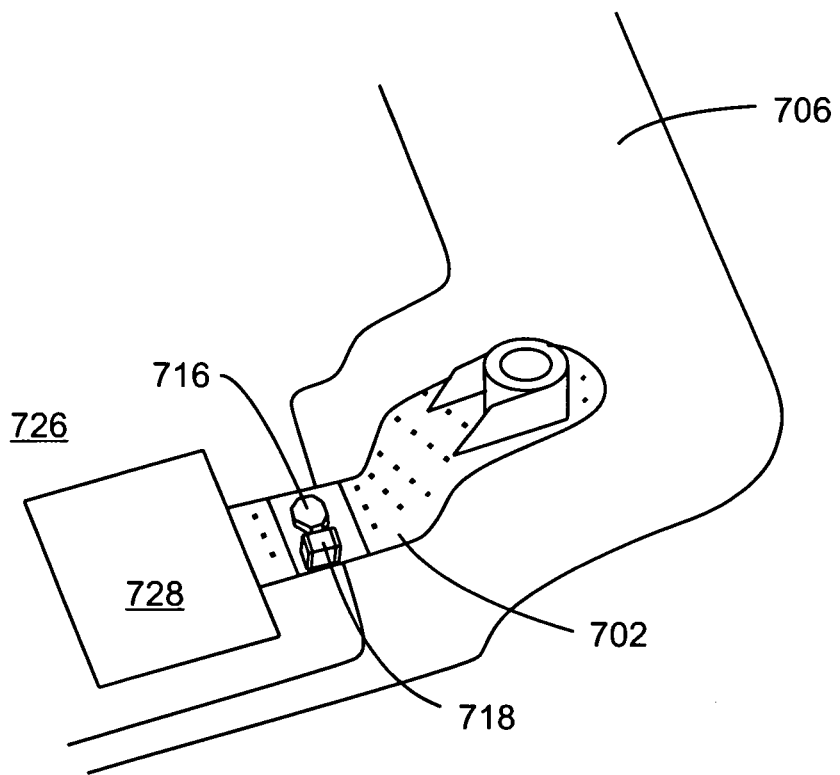
FIG. 7 is a fragmentary perspective view of another flexible printed circuit board and LC filter attached to a bottom cover of a generic tablet computer or laptop computer.

FIG. 7 is a fragmentary perspective view of a flexible printed circuit board 702 and LC filter including a capacitor 718 and an inductor 716 attached to a bottom cover 706 of a generic tablet computer or laptop computer. Flexible printed circuit board 702 bends or curves to follow the curved contour of bottom cover 706. A conductive area 724 of board 702 engages an electrically conductive surface section 726 of bottom cover 706. Flexible printed circuit board 702 may be attached to electrically conductive surface section 726 of bottom cover 706 with copper tape 728. Conductive areas 724 of flexible printed circuit board 702 may enable good electrical contact to the electrically conductive surface of bottom cover 706 without the need for soldering. Flexible circuit 702 can bend to accommodate elevation changes in bottom cover 706 of the enclosure. The holes in flexible printed circuit board 702 can be used for alignment or mounting. The two-sided conductive areas 724 of flexible printed circuit board 702 accommodate physical contact to bottom cover 706 via conductive tape, a conductive gasket, or other attachment devices.

With regard to determining the values of the inductors and capacitors in the filters, because practical components are far from being ideal inductors and capacitors, there are tradeoffs to be made in choosing the values. For example, practical inductors and capacitors exhibit self-resonance frequencies at which they stop behaving as an inductor and a capacitor, respectively. These components also exhibit series parasitic resistances that alter their performance.

The first tradeoff to consider is that values of L and C may be chosen such that the circuit is resonated at the wireless charging resonance frequency f of 6.78 MHz, wherein $$L \cdot C = \frac{1}{(2\pi f)^2} = 5.5e^{-16}[\text{sec}^2] \quad (1)$$

Figure 8:
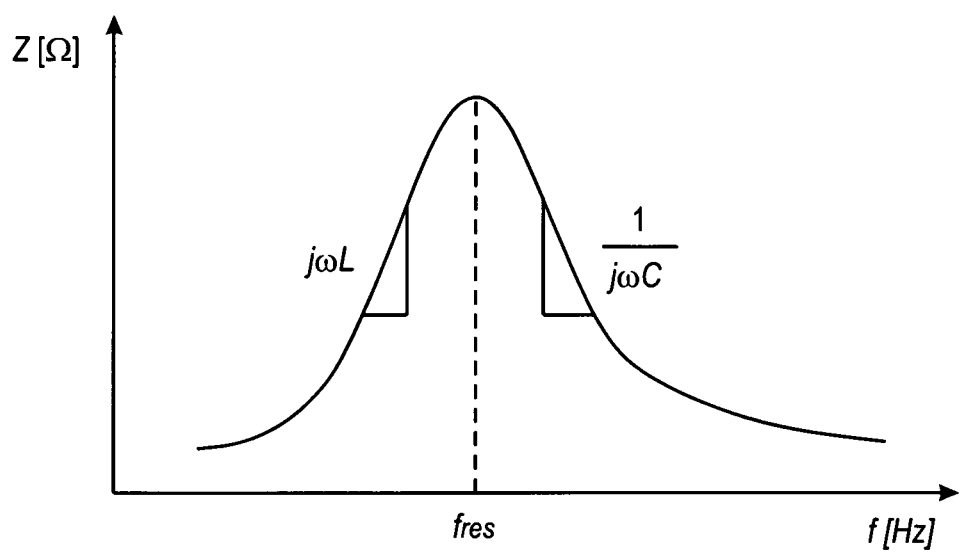
FIG. 8 is a plot of the impedance of a parallel LC circuit.

The second tradeoff to consider is the slopes of the rising and falling portion of the curve of the transfer function of a parallel LC circuit, as shown in FIG. 8. These slopes are determined by the values of the inductor and capacitor, and therefore determine the peak impedance at the resonance frequency $f_{res}$ and the impedances at lower frequency. Therefore, at a given resonant frequency, a large inductor value may call for a small capacitor value (as indicated by (1)), resulting in high impedance at the resonant frequency (good for wireless charging) and relatively high impedance at higher frequencies (bad for EMI/ESD). Alternatively, a small inductor value may call for a large capacitor value (as indicated by (1)), resulting in low impedance at the resonant frequency (bad for wireless charging) and relatively low impedance at higher frequencies (good for EMI/ESD). Hence, a there may be a tradeoff between what is good for wireless charging and what is good for EMI/ESD.

Figure 9:
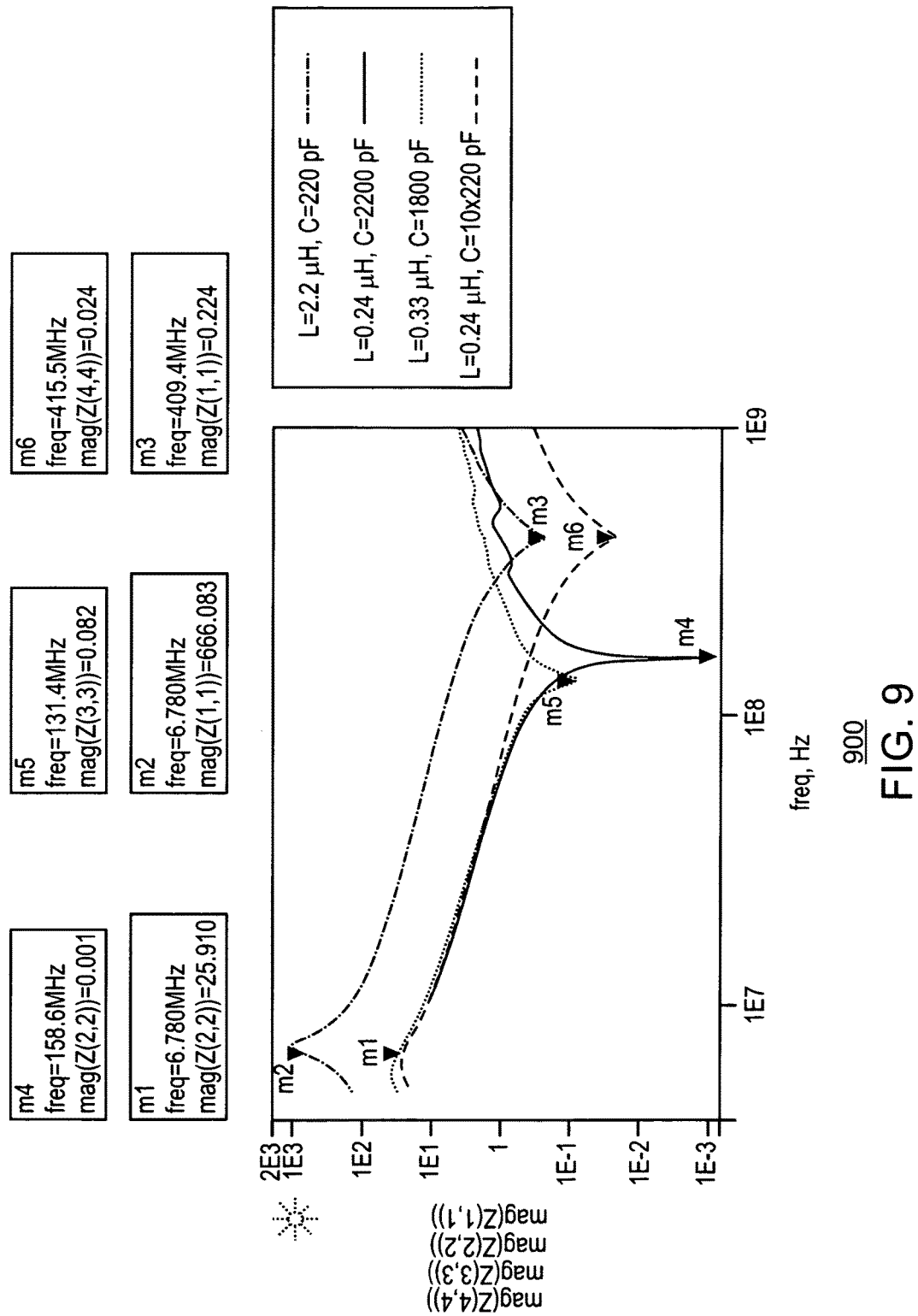
FIG. 9 is a plot LC filter impedance using real components.

To explore practical parallel LC resonant circuits and their application, a simulation based on measured S-parameters of LC pairs may be obtained, as shown in FIG. 9, wherein the principles and tradeoffs of choosing the LC values are exhibited. For example, using L=2.2 µH and C=220 pF results in high impedance at 6.78 MHz (666 Ohm), as well as relatively high impedances at higher frequencies. On the other hand, utilizing L=0.24 µH and C=2200 pF results in low impedance at 6.78 MHz (26 Ohm), as well as relatively low impedances at higher frequencies. Due to the parasitics of the LC components, at certain frequencies the circuit behaves more like a series resonant circuit.

The disclosure has been described herein as being applied to laptop computers and tablet computers. However, the disclosure may also be applied to any electronic products employing magnetic inductive charging.

EXAMPLES

Example 1 is a computing device with ElectroMagnetic Interference (EMI) suppression and wireless charging. The computing device includes a charging coil for emitting a charging current when placed in a magnetic field produced by a wireless power transmitter, a wireless charging operating frequency being associated with wireless charging of a battery of the computing device by the charging coil and the wireless power transmitter; an electrically conductive substrate having a plurality of gaps for reducing eddy currents when the electrically conductive substrate is disposed between the charging coil and the wireless power transmitter during charging of the battery; and a plurality of filters each electrically bridging a respective one of the gaps, each filter attenuating signals within a range of frequencies including the wireless charging operating frequency.

Example 2 includes the computing device of example 1, including or excluding optional features. In this example, each of the gaps is a respective slit.

Example 3 includes the computing device of any one of examples 1 to 2, including or excluding optional features. In this example, the electrically conductive substrate has an electrically conductive coating covering an electrically non-conductive base, the gaps being in the electrically conductive coating but not in the electrically non-conductive base.

Example 4 includes the computing device of any one of examples 1 to 3, including or excluding optional features. In this example, each filter includes a capacitive element and an inductive element connected in parallel across the respective gap. Optionally, values of the capacitive element and the inductive element satisfy:

$$L \cdot C = \frac{1}{(2\pi f)^2} = 5.5e^{-16} [\sec^2]$$

wherein f is the wireless charging operating frequency.

Example 5 includes the computing device of any one of examples 1 to 4, including or excluding optional features. In this example, each filter includes a flexible printed circuit including an elongate strip having two electrically conductive areas on two opposite ends of the strip, and an electrically non-conductive area disposed between the two electrically conductive areas, the electrically non-conductive area having an inductive element and a capacitive element mounted thereon.

Example 6 includes the computing device of any one of examples 1 to 5, including or excluding optional features. In this example, the computing device includes a window in the electrically conductive substrate, the window increasing a magnitude of the magnetic field produced by a wireless power transmitter at the charging coil. Optionally, the gaps are in communication with the window.

Example 7 includes the computing device of any one of examples 1 to 6, including or excluding optional features. In this example, each filter passes frequencies emitted by the computing device during operation.

Example 8 includes the computing device of any one of examples 1 to 7, including or excluding optional features. In this example, each filter passes harmonics of frequencies emitted by the computing device during operation.

Example 9 is a computing device with ElectroMagnetic Interference (EMI) suppression and wireless charging. The computing device includes a charging coil for emitting a charging current when placed in a magnetic field produced by a wireless power transmitter, a wireless charging operating frequency being associated with wireless charging of a battery of the computing device by the charging coil and the wireless power transmitter; an electrically conductive substrate having a plurality of slits for reducing eddy currents when the electrically conductive substrate is disposed between the charging coil and the wireless power transmitter during charging of the battery; and a plurality of filters each electrically coupled to the substrate, each filter having substantially no electrical effect on an impedance of a respective one of the slits at frequencies within a range of the wireless charging operating frequency, and electrically shorting across the respective one of the slits at frequencies outside the range of the wireless charging operating frequency.

Example 10 includes the computing device of example 9, including or excluding optional features. In this example, each adjacent pair of the slits electrically isolates a respective section of the electrically conductive substrate.

Example 11 includes the computing device of any one of examples 9 to 10, including or excluding optional features. In this example, the electrically conductive substrate has an electrically conductive coating covering an electrically non-conductive base, the slits being in the electrically conductive coating but not in the electrically non-conductive base.

Example 12 includes the computing device of any one of examples 9 to 11, including or excluding optional features. In this example, each filter includes a capacitive element and an inductive element connected in parallel across the respective slit.

Example 13 includes the computing device of any one of examples 9 to 12, including or excluding optional features. In this example, each filter includes a flexible printed circuit.

Optionally, the flexible printed circuit includes an elongate strip having two electrically conductive areas on two opposite ends of the strip, and an electrically non-conductive area disposed between the two electrically conductive areas, the electrically non-conductive area having an inductive element and a capacitive element mounted thereon.

Example 14 includes the computing device of any one of examples 9 to 13, including or excluding optional features. In this example, the computing device includes a window in the electrically conductive substrate, the window increasing the magnetic field at the charging coil. Optionally, the slits extend in radially outward directions from the window.

Example 15 includes the computing device of any one of examples 9 to 14, including or excluding optional features. In this example, each filter passes frequencies emitted by the computing device during operation. Optionally, each filter passes harmonics of frequencies emitted by the computing device during operation.

Example 16 is a method of manufacturing a computing device with ElectroMagnetic Interference (EMI) suppression and wireless charging, the method. The method includes providing an electrically conductive substrate with a plurality of gaps; coupling a plurality of filters to the electrically conductive substrate such that each filter electrically bridges a respective one of the gaps; and disposing a charging coil adjacent to the substrate within a frame of the computing device.

Example 17 includes the method of example 16, including or excluding optional features. In this example, each of the gaps is a respective slit.

Example 18 includes the method of any one of examples 16 to 17, including or excluding optional features. In this example, the electrically conductive substrate has an electrically conductive coating covering an electrically non-conductive base, the gaps being in the electrically conductive coating but not in the electrically non-conductive base.

Example 19 includes the method of any one of examples 16 to 18, including or excluding optional features. In this example, each filter includes a capacitive element and an inductive element connected in parallel across the respective gap.

Example 20 includes the method of any one of examples 16 to 19, including or excluding optional features. In this example, each filter includes a flexible printed circuit.

Example 21 is an apparatus with ElectroMagnetic Interference (EMI) suppression and wireless charging. The apparatus includes means for generating a charging current when placed in a magnetic field, a wireless charging operating frequency being associated with wireless charging of a battery of the computing device; means for shielding the apparatus to reduce ElectroMagnetic Interference (EMI) emitted by components of the apparatus, the means for shielding including a gap for reducing eddy currents in the means for shielding; and means for bridging the gap, wherein the means for bridging the gap electrically shorts circuits the gap at frequencies outside the range of the wireless charging operating frequency.

Example 22 includes the apparatus of example 21, including or excluding optional features. In this example, the gap is a slit.

Example 23 includes the apparatus of any one of examples 21 to 22, including or excluding optional features. In this example, the means for shielding the apparatus includes an electrically conductive coating covering an electrically non-conductive base, the gap in the electrically conductive coating but not in the electrically non-conductive base.

Example 24 includes the apparatus of any one of examples 21 to 23, including or excluding optional features. In this example, the means for bridging the gap includes a capacitive element and an inductive element connected in parallel across the gap. Optionally, values of the capacitive element and the inductive element satisfy:

$$L \cdot C = \frac{1}{(2\pi f)^2} = 5.5e^{-16}[\sec^2]$$

wherein f is the wireless charging operating frequency.

Example 25 includes the apparatus of any one of examples 21 to 24, including or excluding optional features. In this example, the means for bridging the gap includes a flexible printed circuit including an elongate strip having two electrically conductive areas on two opposite ends of the strip, and an electrically non-conductive area disposed between the two electrically conductive areas, the electrically non-conductive area having an inductive element and a capacitive element mounted thereon.

Example 26 includes the apparatus of any one of examples 21 to 25, including or excluding optional features. In this example, the apparatus includes a window in the means for shielding the apparatus, the window increasing a magnitude of the magnetic field produced by a wireless power transmitter at the charging coil. Optionally, the gap is in communication with the window.

Example 27 includes the apparatus of any one of examples 21 to 26, including or excluding optional features. In this example, the means for bridging the gap passes frequencies emitted by the computing device during operation.

Example 28 includes the apparatus of any one of examples 21 to 27, including or excluding optional features. In this example, the means for bridging the gap passes harmonics of frequencies emitted by the computing device during operation.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device, comprising:
   a charging coil for emitting a charging current when placed in a magnetic field produced by a wireless power transmitter, a wireless charging operating frequency being associated with wireless charging of a battery of the computing device by the charging coil and the wireless power transmitter;
   an electrically conductive substrate having a plurality of gaps for reducing eddy currents when the electrically conductive substrate is disposed between the charging coil and the wireless power transmitter during charging of the battery; and
   a plurality of filters each electrically bridging a respective one of the gaps, each filter attenuating signals within a range of frequencies including the wireless charging operating frequency.

2. The computing device of claim 1, wherein each of the gaps comprises a respective slit.

3. The computing device of claim 1, wherein the electrically conductive substrate has an electrically conductive coating covering an electrically non-conductive base, the gaps being in the electrically conductive coating but not in the electrically non-conductive base.

4. The computing device of claim 1, wherein each filter comprises a capacitive element and an inductive element connected in parallel across the respective gap.

5. The computing device of claim 4, wherein values of the capacitive element and the inductive element satisfy:

$$L \cdot C = \frac{1}{(2\pi f)^2} = 5.5e^{-16}[\sec^2]$$

wherein f is the wireless charging operating frequency.

6. The computing device of claim 1, wherein each filter comprises a flexible printed circuit comprising an elongate strip having two electrically conductive areas on two opposite ends of the strip, and an electrically non-conductive area disposed between the two electrically conductive areas, the electrically non-conductive area having an inductive element and a capacitive element mounted thereon.

7. The computing device of claim 1, further comprising a window in the electrically conductive substrate, the window increasing a magnitude of the magnetic field produced by a wireless power transmitter at the charging coil.

8. The computing device of claim 7, wherein the gaps are in communication with the window.

9. The computing device of claim 1 wherein each filter passes frequencies emitted by the computing device during operation.

10. The computing device of claim 9, wherein each filter passes harmonics of frequencies emitted by the computing device during operation.

11. A computing device, comprising:
- a charging coil for emitting a charging current when placed in a magnetic field produced by a wireless power transmitter, a wireless charging operating frequency being associated with wireless charging of a battery of the computing device by the charging coil and the wireless power transmitter;
- an electrically conductive substrate having a plurality of slits for reducing eddy currents when the electrically conductive substrate is disposed between the charging coil and the wireless power transmitter during charging of the battery; and
- a plurality of filters each electrically coupled to the substrate, each filter having substantially no electrical effect on an impedance of a respective one of the slits at frequencies within a range of the wireless charging operating frequency, and electrically shorting across the respective one of the slits at frequencies outside the range of the wireless charging operating frequency.

12. The computing device of claim 11, wherein each adjacent pair of the slits electrically isolates a respective section of the electrically conductive substrate.

13. The computing device of claim 11, wherein the electrically conductive substrate has an electrically conductive coating covering an electrically non-conductive base, the slits being in the electrically conductive coating but not in the electrically non-conductive base.

14. The computing device of claim 11, wherein each filter comprises a capacitive element and an inductive element connected in parallel across the respective slit.

15. The computing device of claim 11, wherein each filter comprises a flexible printed circuit.

16. The computing device of claim 15, wherein the flexible printed circuit comprises an elongate strip having two electrically conductive areas on two opposite ends of the strip, and an electrically non-conductive area disposed between the two electrically conductive areas, the electrically non-conductive area having an inductive element and a capacitive element mounted thereon.

17. The computing device of claim 11, further comprising a window in the electrically conductive substrate, the window increasing the magnetic field at the charging coil.

18. The computing device of claim 17, wherein the slits extend in radially outward directions from the window.

19. The computing device of claim 11 wherein each filter passes frequencies emitted by the computing device during operation.

20. The computing device of claim 19, wherein each filter passes harmonics of frequencies emitted by the computing device during operation.

* * * * *